(12) United States Patent
Bourgeois et al.

(10) Patent No.: US 8,665,591 B2
(45) Date of Patent: Mar. 4, 2014

(54) SYSTEMS AND METHODS TO THERMALLY MANAGE ELECTRONIC DEVICES

(75) Inventors: Richard Bourgeois, Albany, NY (US); Kristopher Frutschy, Niskayuna, NY (US); Mohamed Sakami, Niskayuna, NY (US); William Waters, Niskayuna, NY (US); Mao Leng, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 429 days.

(21) Appl. No.: 12/974,512

(22) Filed: Dec. 21, 2010

(65) Prior Publication Data

US 2012/0155025 A1    Jun. 21, 2012

(51) Int. Cl.
*H05K 7/20* (2006.01)

(52) U.S. Cl.
USPC .................. 361/679.5; 361/679.51; 361/691; 361/694; 62/259.2; 454/184

(58) Field of Classification Search
USPC ........ 361/676–678, 679.46–679.54, 688–698
See application file for complete search history.

(56) References Cited

U.S. PATENT DOCUMENTS

| | | | | |
|---|---|---|---|---|
| 5,718,628 | A * | 2/1998 | Nakazato et al. | 454/184 |
| 6,990,817 | B1 * | 1/2006 | Bhatia | 62/5 |
| 7,500,911 | B2 * | 3/2009 | Johnson et al. | 454/184 |
| 7,568,360 | B1 * | 8/2009 | Bash et al. | 62/186 |
| 7,751,188 | B1 * | 7/2010 | French et al. | 361/691 |
| 2009/0173473 | A1 * | 7/2009 | Day | 165/67 |
| 2009/0251860 | A1 * | 10/2009 | Belady et al. | 361/690 |
| 2011/0182028 | A1 * | 7/2011 | Tan et al. | 361/679.46 |

* cited by examiner

*Primary Examiner* — Courtney Smith
(74) *Attorney, Agent, or Firm* — GE Global Patent Operation; John A. Kramer

(57) ABSTRACT

A system for an electronic device includes a housing having one or more walls that define an internal region. An outlet port is fluidically coupled to the internal region of the housing, which allows emission of a fluid from the internal region of the housing as a first flow at a first temperature. A merging element, fluidically coupled to the outlet port, merges the first flow with a second flow, which has a second temperature that is less than the first temperature.

31 Claims, 14 Drawing Sheets

SYSTEMS AND METHODS TO THERMALLY MANAGE ELECTRONIC DEVICES

BACKGROUND

1. Technical Field

The subject matter disclosed herein relates to the storage and use of electronic devices. In particular, the subject matter relates to management of an operating environment for an energy storage device.

2. Discussion of Art

Electronic devices can include energy storage devices. Energy storage devices, such as batteries, may provide power storage. Heat may be generated during use. Thermal management of the device may involve the transport of heated air away from the electronic device.

Conventional thermal management solutions include heat exchangers and manifold venting. These allow hot air to be emitted from a volume surrounding the energy storage device. Heat exchangers may not allow hot air to escape at a desirable rate. Manifold venting, as set forth in the prior art device shown in FIG. 1, allows hot air generated by each battery 132 to be exhausted directly from a cabinet 100 into the atmosphere 102 via a manifold 104 through a vent 110.

It may be desirable to have a thermal management system and method that differ from currently available systems and methods.

BRIEF DESCRIPTION

In one aspect, a system for an electronic device includes a housing having one or more walls that define an internal region. An outlet port is fluidically coupled to the internal region of the housing, which allows emission of a fluid from the internal region of the housing as a first flow at a first temperature. A merging element, fluidically coupled to the outlet port, merges the first flow with a second flow, which has a second temperature that is less than the first temperature.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Embodiments of the invention disclosed herein relate to the storage and use of electronic devices. In particular, the subject matter relates to management of an operating environment for an energy storage device.

Figure 1:
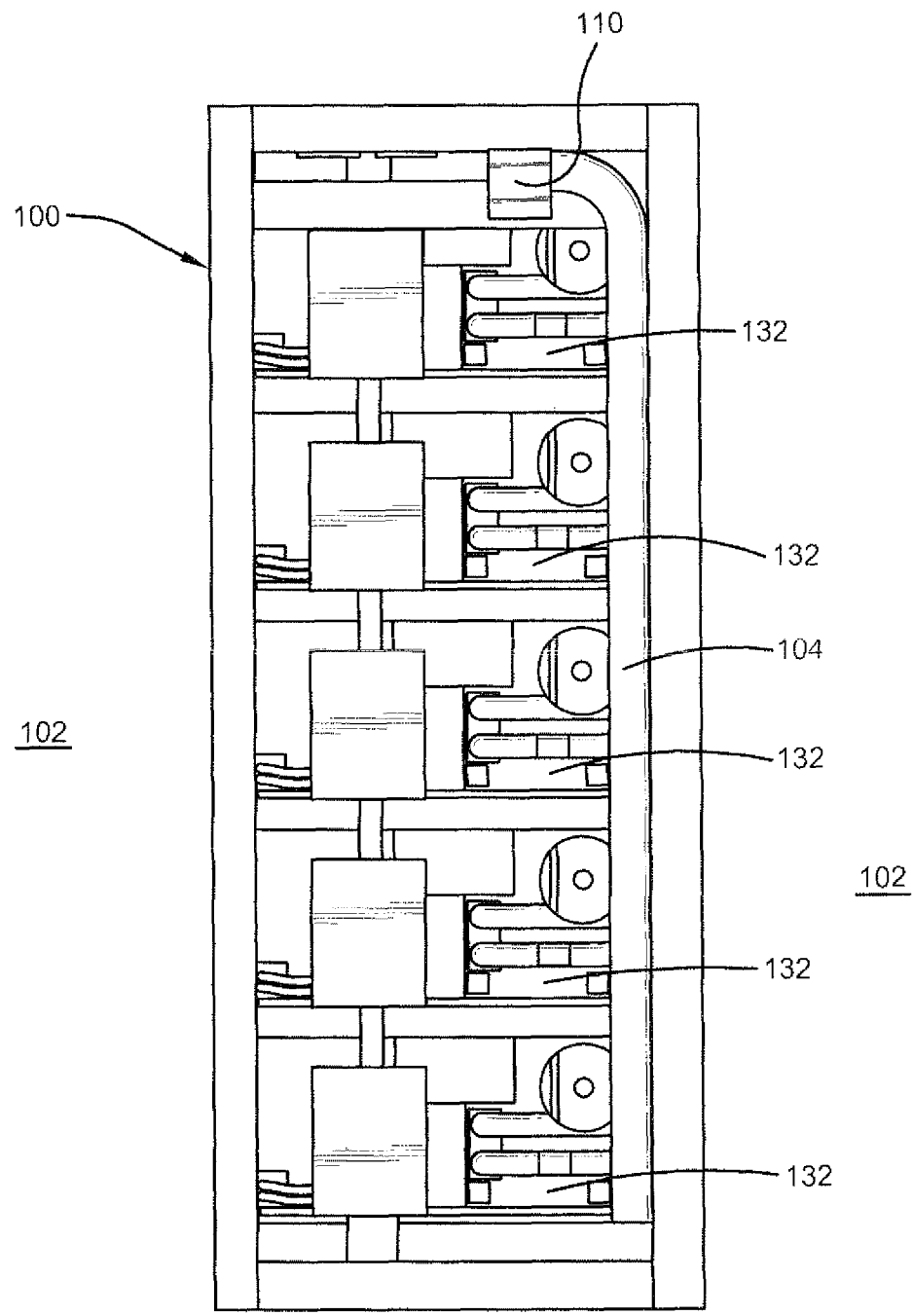
FIG. 1 illustrates a prior art device wherein a common cabinet exhaust manifold and vent are utilized to expel hot air generated by each battery within an enclosure directly into the surrounding atmosphere.
Figure 2:
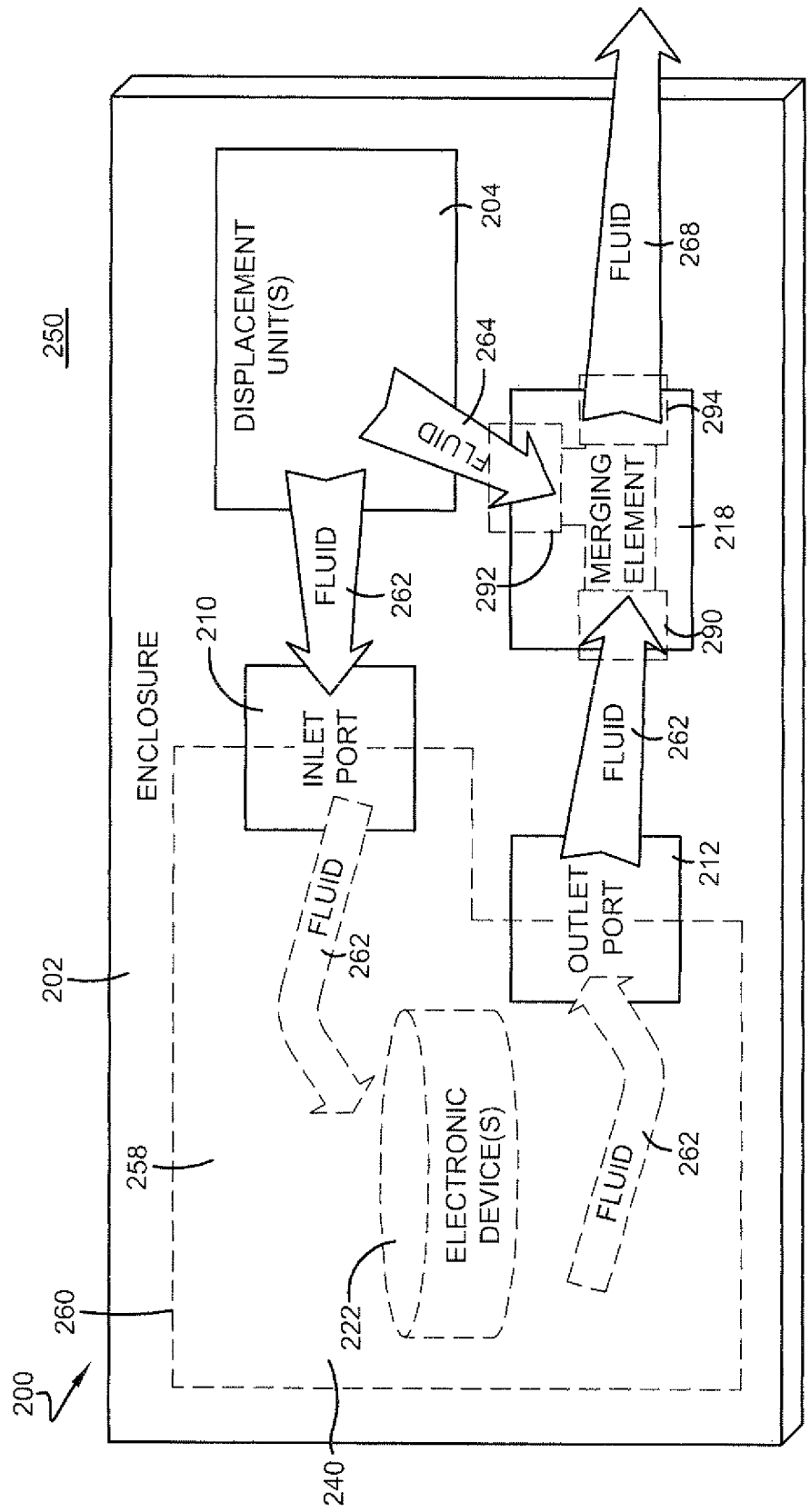
FIG. 2 is a schematic drawing that illustrates operation of a thermal management system in association with an enclosure that houses one or more energy storage devices, according to an embodiment of the invention.

With regard to one embodiment illustrating aspects and features of the invention, FIG. 2 is a schematic of a thermal management system 200 used with a housing 258 within an enclosure 202. The housing 258 can store one or more electronic devices 222 that are employed to perform a desired function such as power generation, power storage, processing, control, and/or data storage. The thermal management system 200 is used to ensure the electronic devices 222 operate within a particular temperature range within the housing 258 while providing an output from the enclosure 202 that is safe to the surrounding environment. In this manner, each enclosure 202 can be thermally managed as a standalone unit. In one example, the enclosure 202 is disposed within a cabinet. In other embodiments, the enclosure may be another platform adjacent to electronic devices or other temperature sensitive devices. The enclosure 202 can operate alongside these components since the temperature emitted from the enclosure 202 is within a determined temperature range.

The housing 258 is formed from a plurality of walls 260, e.g., eight walls, to define an internal region 240. Other embodiments may have a different number of walls. The walls may be formed from a selected material. While the illustrated embodiment is metal, other embodiments may use a polymeric material. The polymeric material may be formed from a neat resin, or may be a composite. In other embodiments, one or more walls are formed by a plurality of layers. For example, the housing may include two or more nested structures, which allow each face to have several layers associated with the disposition of the structures. In one particular example, the structures are cuboids wherein an insulating layer is disposed both between the walls of the inner and outer cuboid and around an exterior surface of the walls. Alternatively or in addition, the walls can define a cube, a cone, a triangular prism, a square-based pyramid, a triangular-based pyramid, a cylinder, or a sphere, where the configuration may be selected based on application specific requirements.

One or more displacement units 204 are mounted to the enclosure 202 to push fluid into desired locations within the thermal management system 200. Fluidic coupling can be employed throughout the thermal management system 200 to facilitate the transport of fluid from one location to another. In this embodiment, the one or more displacement units 204 are fluidically coupled to an inlet port 210 to push a first flow 262 into the internal region 240 of the housing 258. A filter can be employed to prevent particulate or other foreign matter from passing into the housing 258. The first flow 262 can be drawn from a surrounding atmosphere 250 by the one or more displacement units 204 and have a temperature that is less than the temperature of the internal region 240 prior to introduction into the inlet port 210. In one example, the electronic devices 222 generate heat as a result of their operation. To counter such heat generation, the first flow 262 is circulated within the internal region 240 to maintain a desired temperature range via known thermodynamic interactions.

Upon introduction from the inlet port 210, the first flow 262 circulates throughout the internal region 240 and around the electronic devices 222 disposed therein. The first flow 262 is directed to a merging element 218 via an outlet port 212, which is fluidically coupled thereto. The merging element 218 mixes the first flow 262 with a second flow 264, which is also pushed from the one or more displacement units 204. In one embodiment, the displacement units 204 represent a single displacement unit that pushes both the first flow 262 and the second flow 264. In another embodiment, the displacement units 204 represent two devices wherein a first displacement unit pushes the first flow 262 and a second displacement unit pushes the second flow 264.

In either case, the second flow 264 is received by the merging element 218 where it is combined with the first flow 262 emitted from the outlet port 212. The first flow 262 merged or combined with the second flow 264 creates a combined flow 268. In one embodiment, the merging element is a fluid union that contains two input ports and an output port. A first input port 290 receives the first flow 262, a second input port 292 receives the second flow 264, and an output port 294 emits the combined flow 268 to the atmosphere 250. The second flow 264 can be drawn from the atmosphere 250 and thus generally has a temperature that is less than the temperature of first flow 262, as the first flow 262 is heated due to its introduction into the internal region 240 of the housing 258. In this manner, the temperature of the first flow 262 is reduced by its interaction with the second flow 264 within the merging element 218. Such reduction can provide a desired fluid temperature. The fluid temperature may be in a temperature range that is selected for reasons of safety, operational or material limits of components, and that meets one or more regulations (e.g., UL, CE, etc.) associated with the operation of the electronic devices 222.

Figure 3:
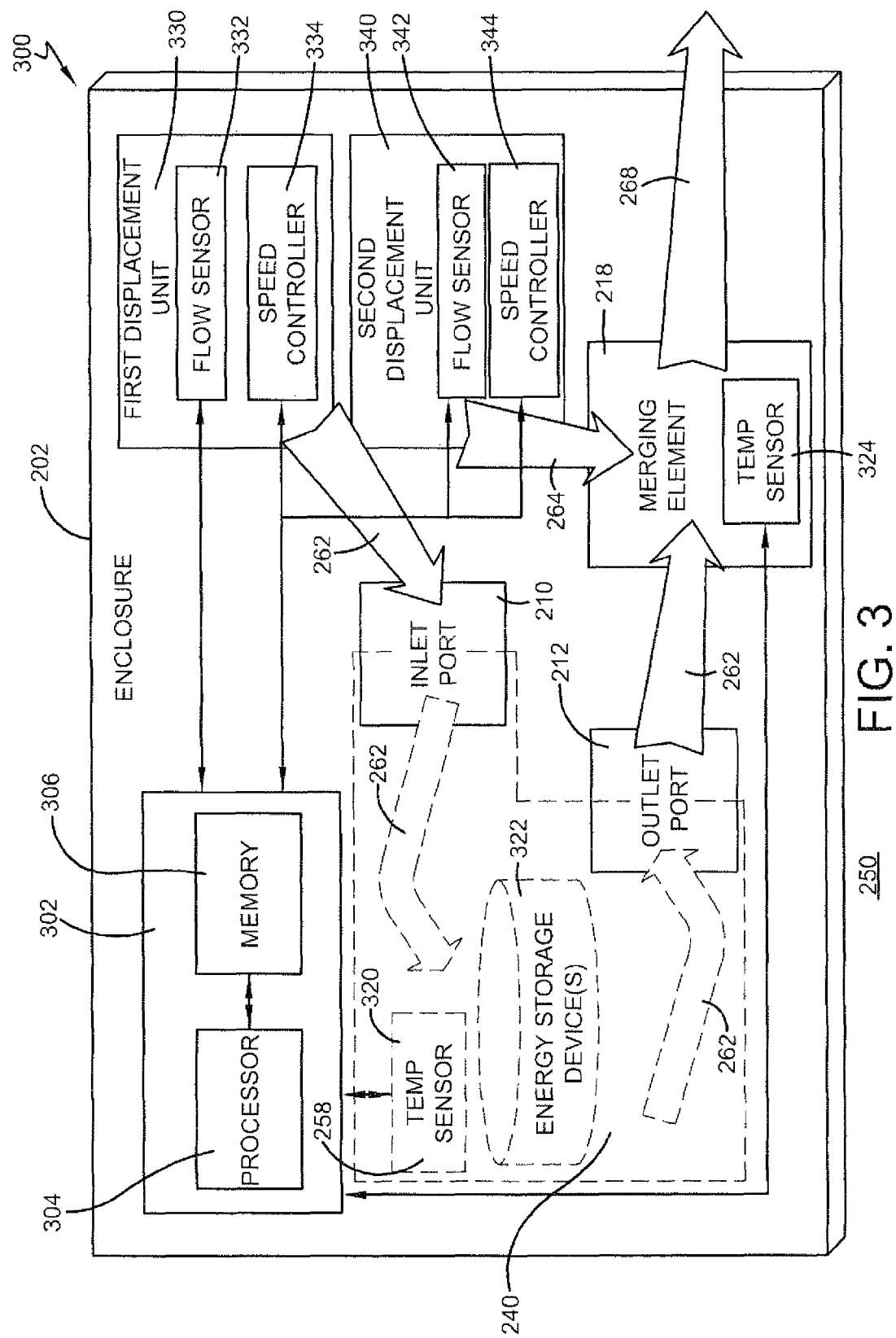
FIG. 3 is a schematic drawing that illustrates a detailed view of the thermal management system of FIG. 2.

FIG. 3 shows a particular embodiment 300 of the thermal management system 200 discussed above. In this example, the one or more displacement units 204 are replaced by a first displacement unit 330 and a second displacement unit 340. The first displacement unit 330 pushes the first flow 262 into the internal region 240 via the inlet port 210. The second displacement unit 340 pushes the second flow 264 into the merging element 218 to lower the temperature of the first flow 262 as it is emitted from the housing 258. In this manner, mass flow rates of the first flow 262 and the second flow 264 can be independently monitored and controlled based at least in part upon temperature values within the thermal management system 300.

Temperature sensors 320 and 324 can measure a temperature of the internal region 240 and a temperature of the combined flow 268 respectively. Flow sensors 332, 342 measure mass flow rate of the first displacement unit 330 and second displacement unit 340 respectively. Data from the sensors 320, 324, 332, and 342 can all be transmitted to a control component 302 for processing and possible subsequent action. For example, the temperature data can be used by the control component 302 to modify mass flow rates of the first and second displacement units 330, 340 to adjust particular temperatures within the thermal management system 300.

The control component 302 processes data received from the temperature sensors 320, 324. In one embodiment, the control component 302 includes a processor 304 and a memory 306. The processor 304 compares the data to parameters stored in the memory 306. If the data is outside these parameters, action can be taken. In one example, the control component 302 can modify the speed of the first displacement unit 330 and/or the second displacement unit 340 via speed controllers 334 and 344 respectively. Such action can lower the temperature of the first flow 262 as it exits the outlet port 212 and/or the combined flow as it exits the merging element 218.

In one embodiment, the control component 302 is a computer that controls, initiates or executes the disclosed architecture. Embodiments may include other program modules and/or as a combination of hardware and software. Program modules may include routines, programs, components, data structures, and the like, that perform particular tasks or implement particular abstract data types. Other computer system configurations may be employed, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

The control component 302 can use an exemplary environment for implementing various aspects of the invention including a processing unit, a system memory and a system bus. The system bus couples system components including, but not limited to the system memory to the processing unit. The processing unit may be any of various commercially available processors. Dual microprocessors and other multiprocessor architectures also can be employed as the processing unit.

The system bus can be any of several types of bus structure including a memory bus or memory controller, a peripheral bus and a local bus. It may be suitable to commercially available bus architectures. The system memory can include read only memory (ROM) and random access memory (RAM). A basic input/output system (BIOS), containing the basic routines that help to transfer information between elements within the control component 302, such as during start-up, is stored in the ROM.

The control component 302 can further include a hard disk drive, a magnetic disk drive, e.g., to read from or write to a removable disk, and an optical disk drive, e.g., for reading a CD-ROM disk or to read from or write to other optical media. The control component 302 can include at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the control component 302.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are included within the scope of computer readable media.

A number of program modules may be stored in the drives and RAM, including an operating system, one or more application programs, other program modules, and program data. A suitable operating system in the control component can be a Linux based operating system.

In addition, a user may enter commands and information into the computer through a keyboard and a pointing device, such as a mouse. Other input devices may include a microphone, an IR remote control, a track ball, a pen input device, a joystick, a game pad, a digitizing tablet, a satellite dish, a scanner, or the like. These and other input devices are often connected to the processing unit through a serial port interface that is coupled to the system bus, but may be connected by other interfaces, such as a parallel port, a game port, a universal serial bus ("USB"), an IR interface, and/or various wireless technologies. A monitor or other type of display device, may also be connected to the system bus via an interface, such as a video adapter. Visual output may also be accomplished through a remote display network protocol such as Remote Desktop Protocol, VNC, X-Window System, and like protocols. In addition to visual output, the computer may include other peripheral output devices, such as speakers, printers, and other data output ports.

With the control component, a display can present data that is electronically received from the processing unit. For example, the display can be an LCD, plasma, CRT, etc. monitor that presents data electronically. Alternatively or in addition, the display can present received data in a hard copy format such as a printer, facsimile, plotter etc. The display can present data in any color and can receive data from the control component 302 via any wireless or hard wire protocol and/or standard.

The control component 302 can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes any or all of the elements described relative to the control component 302. The logical connections depicted include a local area network (LAN) and a wide area network (WAN). Such networking environments are commonplace in offices, enterprise-wide computer networks, intranets and the Internet.

When used in a LAN networking environment, the control component 302 is connected to a local network through a network interface or adapter. When used in a WAN networking environment, the control component 302 typically includes a modem, or is connected to a communications server on the LAN, or has other means for establishing communications over the WAN, such as the Internet. In a networked environment, program modules depicted relative to the computer, or portions thereof; may be stored in the remote memory storage device. It will be appreciated that network connections described herein are exemplary and other means of establishing a communications link between the control component 302 and one or more devices (e.g., computers) may be used.

In one exemplary operation, the control component 302 compares temperature information from the temperature sensor 320 to a threshold stored in the memory 306. In response, the control component 302 can increase the mass flow rate of the first displacement unit 330 via the speed controller 334. The flow sensor 332 can be monitored to insure that the speed rate transmitted to the first displacement unit is at the level desired. In case the temperature as received from the temperature sensor 320 is not lower than a threshold, the control component 302 can increase the speed controller 334 to increase mass flow rate of the first displacement unit 330. If this mass flow rate increase does not lower the temperature of the internal region, the control component 302 can increase the mass flow rate of the second displacement unit via the speed controller 344 to output fluid to output the second flow 264 at a relatively greater rate. As the second flow 264 may be cooler than the first flow 262, the temperature sensor 324 at the merging element 218 should indicate a decrease in temperature.

Once the temperature output by the temperature sensor 324 to the control component 302 is determined to be lower than a threshold, the speed controller 344 can be decreased by the control component 302 to output a standard rate of second flow 264. This condition can be monitored on a periodic basis to insure that a desired temperature for the combined flow 268 is maintained. The operation to provide thermal management within the thermal management system 300 can be selected based on various external factors and conditions. Use of feedback control systems can maintain desired temperature ranges both within the internal region and for the combined flow.

In one example, the electronic devices are energy storage devices 322, e.g., batteries, that operate on a cyclical basis for a period of time. The energy storage devices 322 can be held at a temperature of around 300 degrees Celsius while in a dormant state and, once power delivery is required, the energy storage devices 322 can be activated thereby generating heat in operation. The energy storage devices 322 can operate for a period of time (e.g., 20 minutes) before a maximum operating temperature (e.g., around 350 degrees Celsius) is reached within the housing 258. At this point, battery operation may be, or may not be, halted and cooling of the internal region 240 can begin. Alternatively or in addition, the use of the thermal management system 300 can extend the length of battery activation as the time to reach a maximum temperature can be extended by cooling the batteries during operation.

Figure 4:
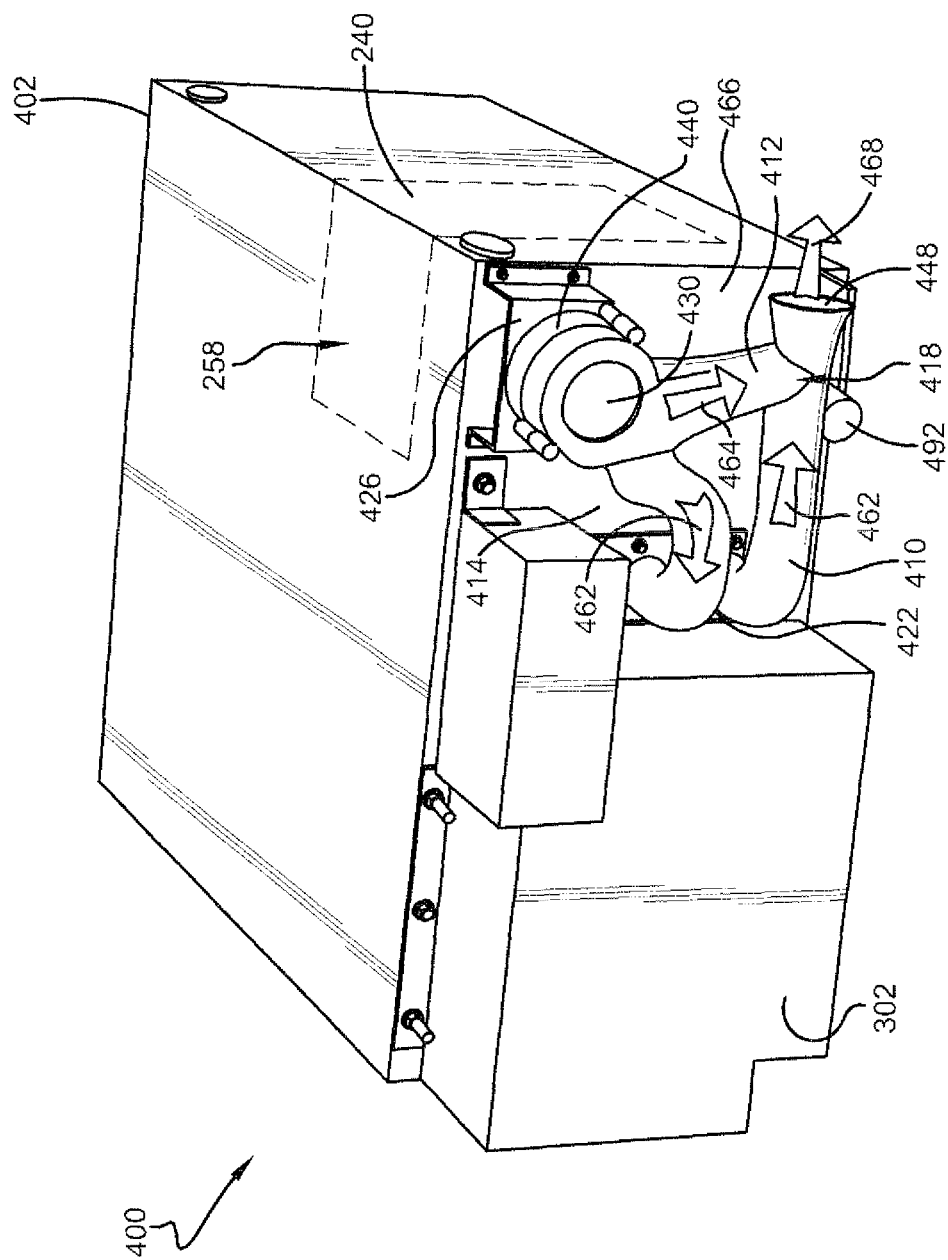
FIG. 4 is a perspective view of an exemplary embodiment of the thermal management system that employs two displacement units to push a first fluid into an enclosure and to combine the first fluid emitted from the enclosure with a second fluid before it is expelled to the surrounding atmosphere.

FIG. 4 illustrates an exemplary thermal management system 400 for an enclosure 402, which contains a housing 258 that stores one or more electronic devices. In this embodiment, the electronic devices are energy storage devices. In one example, the energy storage devices operate at a temperature range of from about 200 degrees Celsius to about 250 degrees Celsius, from about 250 degrees Celsius to about 270 degrees Celsius, from about 270 degrees Celsius to about 300 degrees Celsius, or from about 300 degrees Celsius to about 700 degrees Celsius.

A first blower 440 or other first displacement unit pushes a first air flow 462 into the housing 258 via a conduit 414 that is of an appropriate size and made from an appropriate material for such purpose. An inlet port (not shown) is disposed on a wall 466 of the enclosure 402 to fluidically couple the conduit 414 to the internal region 240. A single outlet port 422 is disposed on the wall 466 to permit a single point of egress for the first air flow 462 from the internal region 240. In this manner, cool air from outside the enclosure 402 can serve as a governor of temperature based on the amount of air circulated through the housing 258 over a period of time.

In one example, the first blower 440 pushes between 0.1 to 500 cubic feet of air per minute. In another example, the first blower pushes between 1 to 2 cubic feet of air per minute within the housing 258. The mass flow rate of the first air flow 462 into the housing 258 may be associable with a cooling power, which may be dictated by the heat of the internal region 240 over time. In one embodiment, the cooling power required for an exemplary sized housing 258 is between 800 to 1500 watts. The cooling power, however, can vary between 0.1 to 5000 watts based on various configurations of the thermal management system 400, including the number and type of energy storage devices within the housing 258, the size of the housing 258, the shape of the housing 258, and the like.

A second blower 430 or other second displacement unit introduces a second air flow 464 into a merging element 418 via a conduit 412. The first air flow 462 exhausted from the housing 258 flows through the outlet port 422 and through a conduit 410 into the merging element 418. The air flows 464 and 462 are combined within the merging element 418 and subsequently exhausted as a combined air flow 468 via an exhaust port 448. In this manner, the blowers 430 and 440 may provide an elegant thermal management solution wherein the speed and duration of the rate of each blower is dictated by the control component 302 as described above. Moreover, the thermal management may be individually and/or independently controlled for each of a plurality of energy storage devices that may be stored within a single unit, such as a cabinet or cabinet equivalent. These assemblies can be employed where power is stored for delivery when a utility grid failure occurs, such as within an uninterruptible power supply, or when a renewable energy source does not provide power.

The blowers 430 and 440 are secured to the wall 466 via a mounting element 426. Similarly, the conduits 412, 410, and the merging element 418 can all be supported by a mounting element 492. In one example, the mounting elements 426 and 492 are brackets which are secured both to the wall of the enclosure 402 in an airtight manner via one or more fastening devices (e.g., screws, rivets, etc.) and to the blowers and the conduit via the same. Such configuration can provide a sturdy support for such elements and can facilitate efficient troubleshooting, maintenance and replacement of component within the thermal management system 400 as necessary.

Figure 5:
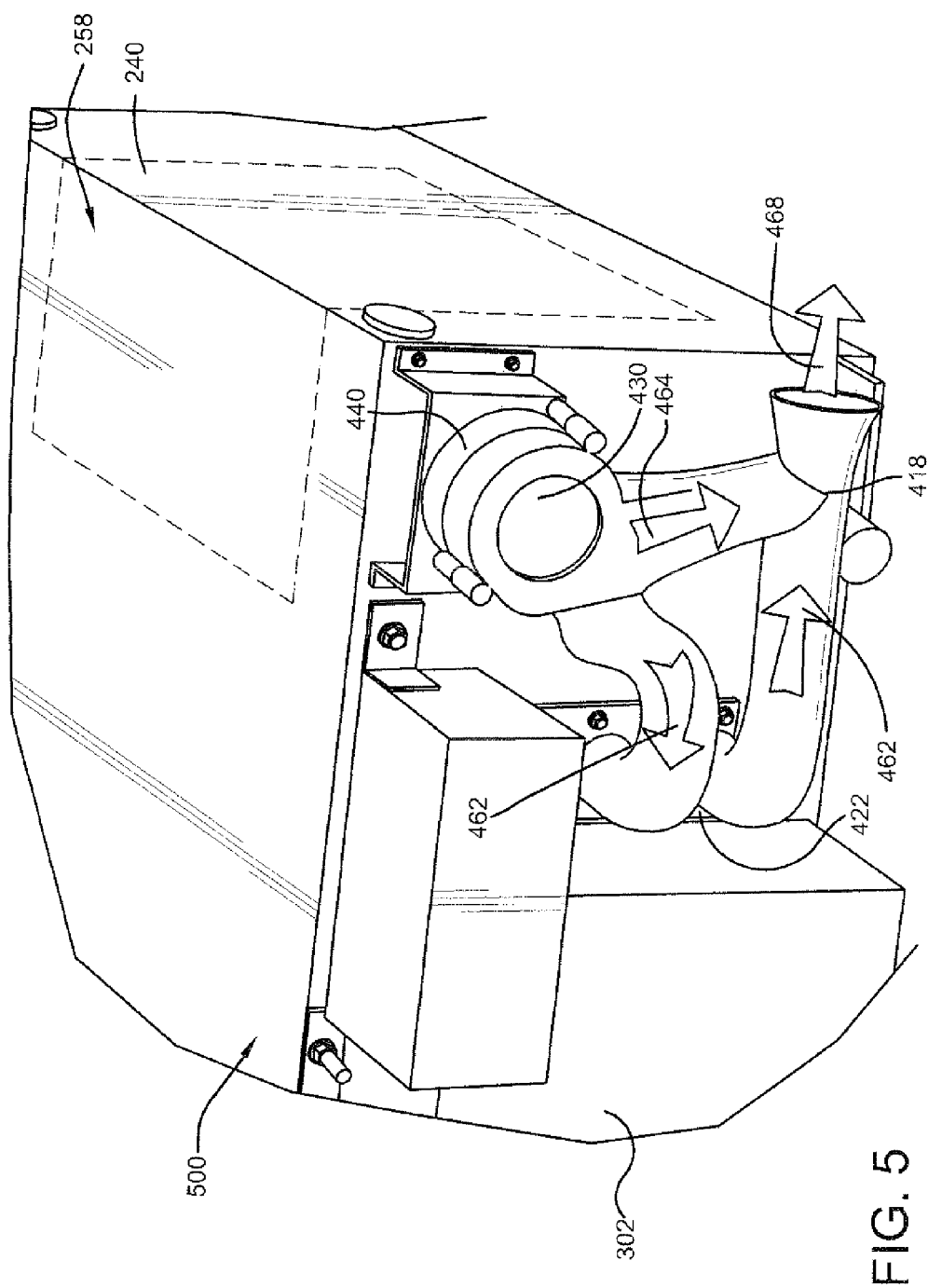
FIG. 5 is a perspective view showing the fluid flow of two displacement units and a merging element to facilitate thermal management of the enclosure surrounding one or more energy storage devices.

FIG. 5 shows an exemplary embodiment 500 which uses the two blowers 430 and 440 (or other displacement units) described with reference to FIG. 4 above. As discussed, the first blower 440 pushes a first air flow 462 into the housing 258 which is circulated therein and emitted via the outlet port 422 to a merging element 418. Here, a second air flow 464 is introduced to lower the temperature of the first air flow 462 before it is emitted as a combined air flow 468. The control component 302 is used to monitor the mass flow rates and temperatures within the system 500 and to modify the output of each of the blowers 440 and 430 as necessary to stay within desired operating parameters. Known thermodynamic properties can be used to mathematically quantify the requirements for output of both the first blower 440 and the second blower 430. One example, the mass flow rate of the first blower 440 can be quantified relative to the internal volume of the housing 258 and/or a temperature of the internal region 240 of the housing 258.

Similarly, the mass flow rate of the second blower 430 can be quantified as a ratio of the mass flow rate of the first blower 440. In one example, the mass flow rate of the second blower 430 is between 5 to 5000 percent of the mass flow rate of the first blower 440. In one particular example, the first blower 440 has a mass flow rate of approximately 1.5 cubic feet per minute per panel (e.g., around 10.5 cubic feet per minute total), wherein a mass flow rate of approximately 5 cubic feet per minute is required for the second blower 430. In this manner, the temperature of the combined flow 268 can be maintained at around 85 degrees Celsius, which is considered to be within a safe range.

One particular quantification of the rate of output necessary for the second blower 430 is calculated as:

$$\dot{W}_{cool} = \dot{m}_{hot} C_{p,h} (T_{hot} - T_{mixing}) \quad \text{Equation 1}$$

$$\dot{W}_{cool} = \dot{m}_{cold} C_{p,c} (T_{mixing} - T_{cold}) \quad \text{Equation 2}$$

$$\dot{m}_{cold} = \frac{\dot{W}_{cool}}{C_{p,c}(T_{mixing} - T_{cold})} \quad \text{Equation 3}$$

wherein $\dot{m}_{hot}$ is the mass flow rate of the first air flow 462, $\dot{m}_{cold}$ is the mass flow rate of the second air flow 464, $C_{p,h}$ is the heat capacity of the first air flow 462, $C_{p,c}$ is the heat capacity of the second air flow 464, $T_{hot}$ is the temperature of the first air flow 462, $T_{cold}$ is the temperature of the second air flow 464, $T_{mixing}$ is the temperature of the combined air flow 468, and $\dot{W}_{cool}$ is the total cooling of power the thermal management system 400. Thus, as set forth in Equation 3, the mass flow rate required for the second air flow 464 can be determined relative to known thermodynamic parameters of the thermal management system 400. The fluid for thermal management utilizing Equations 1, 2, and 3 may be selected with reference to operational specific conditions and requirements.

Figure 6:
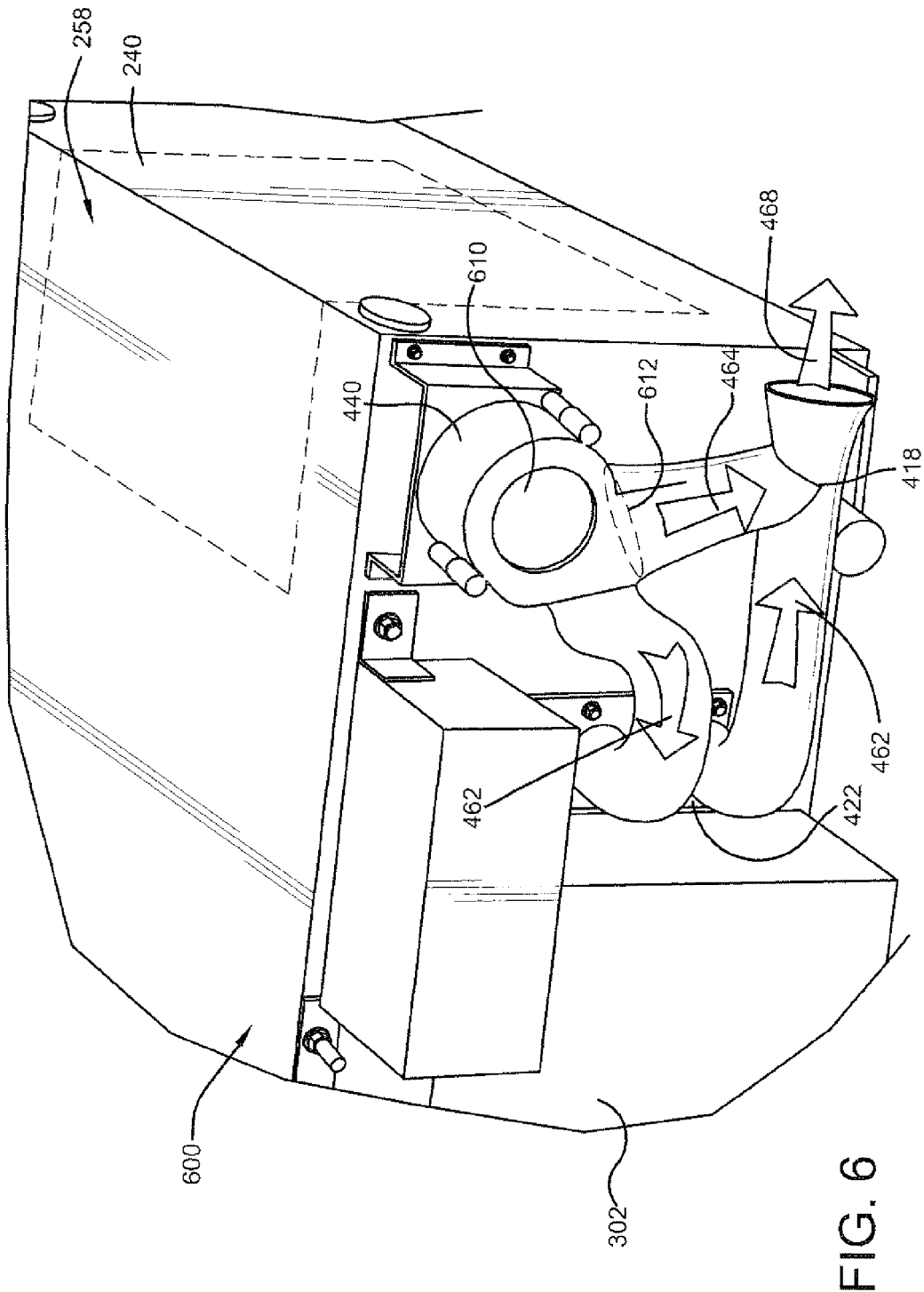
FIG. 6 illustrates a single displacement unit that employs a splitter to provide a first flow into the enclosure and to provide a second flow to combine with the first flow before it is expelled to the surrounding atmosphere.

FIG. 6 shows another exemplary thermal management system 600 that includes a single blower 610 (or other displacement device), which is employed to push both air flows 462, 464 throughout the system. The air flows 462, 464 maintain a temperature of the internal region of the enclosure as well as the temperature of the combined flow 268. In this example, the blower 610 uses a bypass duct 612 in order to direct the first air flow 462 into the internal region 240 and also the second air flow 464 to the merging element 418. The size and mass flow rate requirements of the blower 610 may increase in comparison to a dual displacement unit system discussed herein (e.g., FIGS. 3-5) to accommodate desired thermal ranges.

Figure 7:
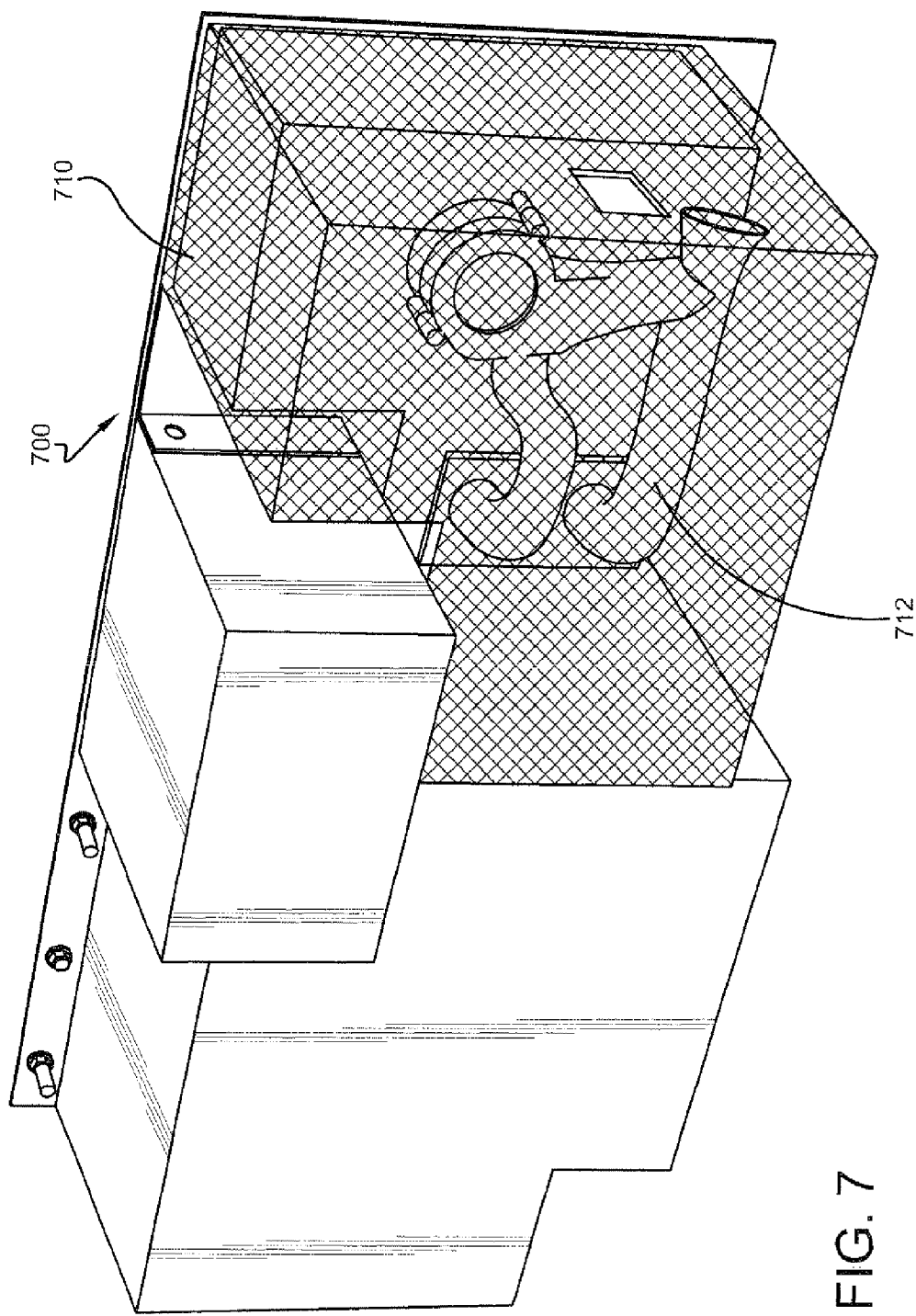
FIG. 7 is a perspective view of a semi-permeable barrier that substantially surrounds an exhaust port to facilitate entrainment of fluid prior to its introduction into the surrounding atmosphere.

FIG. 7 shows an embodiment 700 that includes a semi-permeable barrier 710 that is proximate to and screens off at least a portion of the displacement units 712, and may screen off at least a portion of the exhaust port 448. The barrier may allow emission of the combined air flow 468. The semi-permeable barrier 710 may be used in combination with other aspects of the invention disclosed herein.

In one example, the semi-permeable barrier 710 is a perforate plate that allows the transfer of air therebetween. Other embodiments may include a mesh wire cage. The semi-permeable barrier 710 can be constructed of metal or other suitable material. Materials may be selected, in some embodiments, that can withstand exposure to heated air having a temperature up to about 700 degrees Celsius. The semi-permeable barrier 710 can entrain the combined flow 268, 468 before it is emitted into an environment distant from the exhaust ports. In this manner, the temperature of the combined air flow 468 may be slightly higher than a desired range immediately after emission from the exhaust port 448. As the air is held within semi-permeable barrier 710, it cools to an acceptable level prior to escape from inside the semi-permeable barrier 710 proximate to the exhaust ports and into the surrounding environment. As the semi-permeable barrier 710 may act as a heat sink or heat spreader, and may provide additional cooling, the displacement units 712 may be operated less frequently. Less frequent operation may expend less power and lower overall cost of operation.

Figure 8:
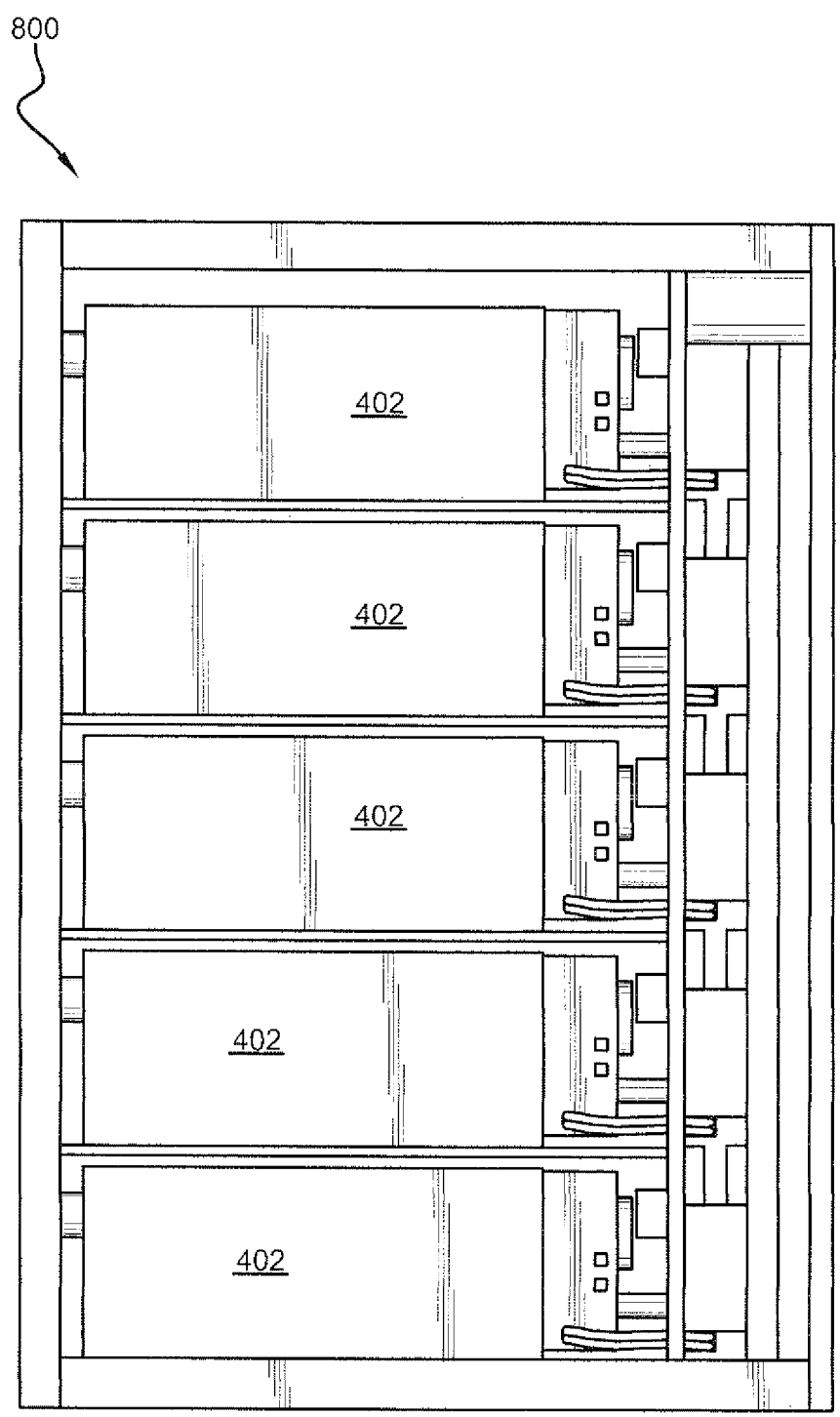
FIG. 8 shows a plurality of enclosures within a cabinet wherein each enclosure, utilizing the subject thermal management system, expels fluid into an internal region of the cabinet.

FIG. 8 illustrates a cabinet 800 that can accommodate a plurality of enclosures 402, which each house one or more energy storage devices. Each enclosure 402 may use an independent thermal management system as set forth herein to provide a desired temperature output of exhaust for each enclosure 402. In this example, air emitted from each enclosure is expelled directly into the interior of the cabinet 800 with no ducting used. A controller can be employed to activate a compressor to chill the first flow, chill the interior of the cabinet, increase the mass flow rate out of an interior region of the cabinet, and/or derate the electronic device to control the amount of heat being generated.

In this example, the cabinet 800 can include a door that is affixed to one side to create an enclosure with an interior space. In another embodiment, the cabinet does not have a door. The electronic devices 402 may rest on shelves and are exposed to ambient air.

Whether the cabinet 800 is enclosed or open, air emitted from each electronic device 402 can be expelled directly therefrom either into the interior of the cabinet or directly into the surrounding atmosphere. In one example, a controller is employed to activate a compressor to chill the first flow, chill the interior of the cabinet, increase the mass flow rate out of an interior region of the cabinet, and/or de-rate the electronic device 402 to control the amount of heat being generated. This controller can be activated in one approach upon detection of failure of a first displacement device or a second displacement device wherein the fluid emitted from the enclosure 402 is at a greater temperature level than desired. In this case, the controller can activate a compressor to chill the interior of the cabinet to maintain the temperature in the cabinet below a threshold. The use of a compressor to maintain air temperature within the interior of the cabinet 800 can be used equally with the interior of a cabinet 900 as set forth in FIG. 9, wherein the interior of the cabinet is exhausted via a blower 912.

Figure 9:
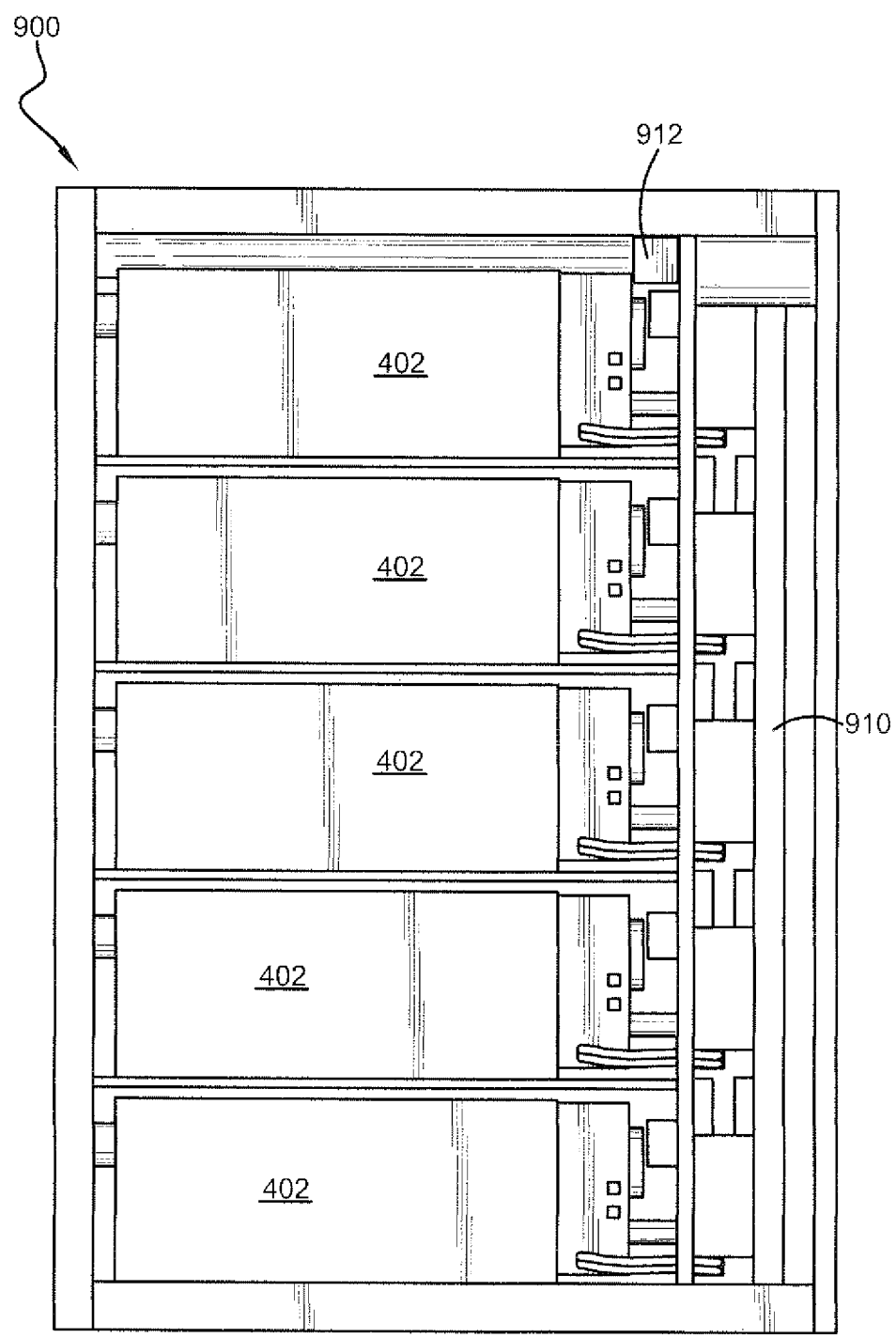
FIG. 9 illustrates a plurality of enclosures within a cabinet wherein each enclosure, utilizing the subject thermal management system, expels air outside the internal region of the cabinet via a common vent.

In another example, a cabinet 900 as shown in FIG. 9 uses a conduit 910 which is coupled to the exhaust ports 448 of each enclosure 402 to provide a common point of egress for all air exhausted from each enclosure 402. The blower 912 as coupled to the conduit 910 to finally exhaust the air from each enclosure 402 into the surrounding atmosphere. Utilizing the subject thermal management system can allow staggered activation of energy storage devices within each cabinet 800, 900, from cabinet-to-cabinet, or other grouping. In one example, a first group of energy banks is activated while disparate banks are cooled in order to prepare for another cycle of activation.

Figure 10:
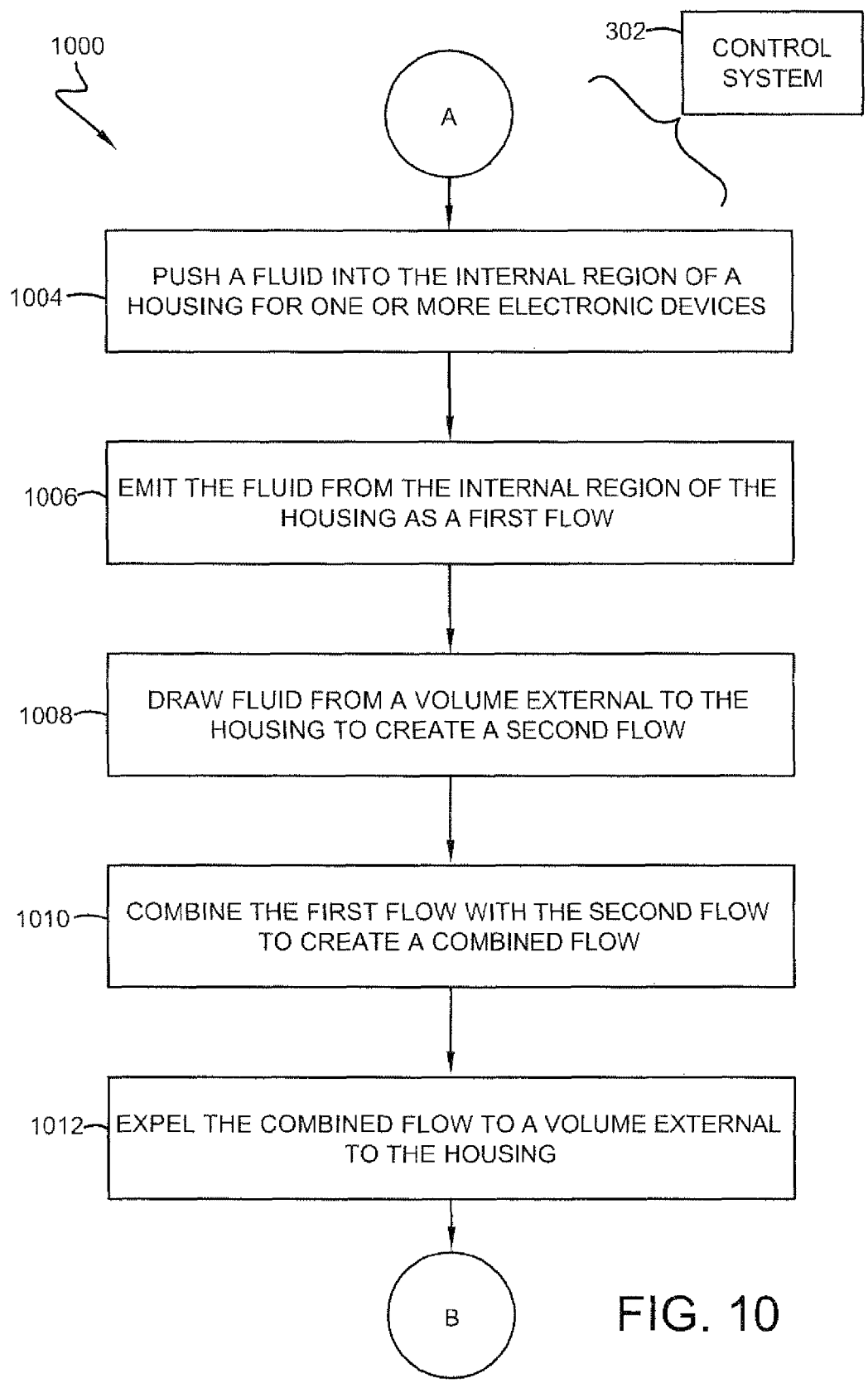
FIG. 10 illustrates a methodology to thermally manage an enclosure with an energy storage device.
Figure 11:
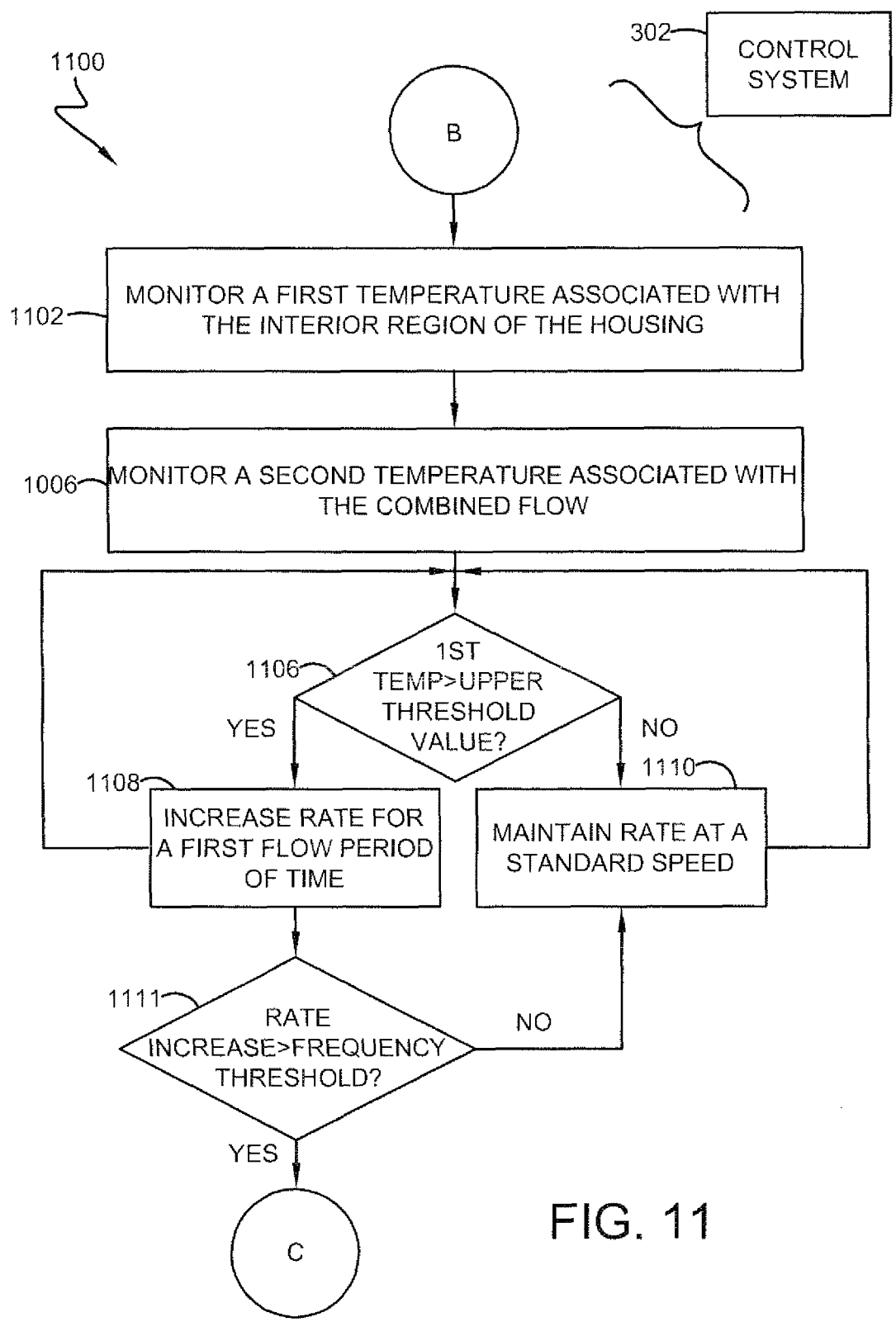
FIG. 11 illustrates a continuation of the methodology of FIG. 10 to thermally manage an enclosure with an energy storage device.
Figure 12:
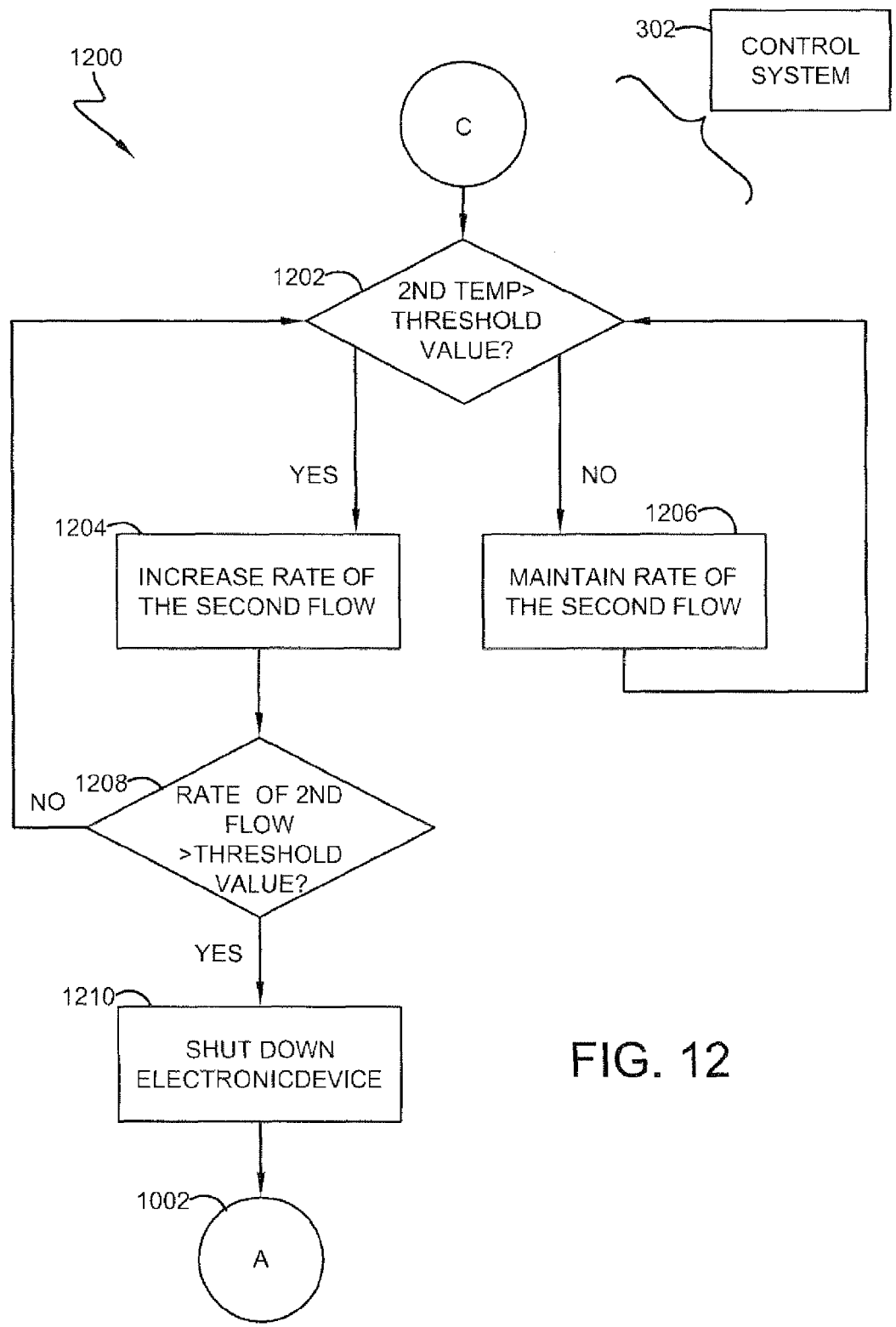
FIG. 12 illustrates a continuation of the methodology of FIGS. 10 and 11 to thermally manage an enclosure with an energy storage device.

FIGS. 10-12 are directed to methodologies 1000, 1100, and 1200 respectively to provide control to the thermal management systems described herein. Each of the methodologies 1000, 1100, and 1200 recite a continuous embodiment that can be used in combination with the control component 302 or other processing device. FIG. 10 shows an exemplary methodology 1000 for fluid flow associated with temperature management of one or more electronic devices. At reference numeral 1004, fluid is pushed into the internal region of a housing for one or more electronic devices. In one example, and applicable to all the embodiments set forth herein, the fluid is a liquid, a gas, a liquid gas, a plasma, a water, an oil, a fuel, a cutting fluid, an organic fluid, a nanofluid, a chlorofluorocarbon, a refrigerant, an antifreeze, a betaine, a methanol, and/or a glycol. The fluid can be pushed via a displacement unit or equivalent.

At 1006, the fluid is emitted from the internal region of the housing as a first flow. In one embodiment, the fluid enters the internal region of the housing at a cooler temperature than the temperature at which it is emitted from the housing. This can be caused by heat output from operation of the one or more electronic devices within the enclosure. In one example, the electronic devices are energy storage devices that are operated at a heated temperature such as a liquid sodium battery.

At 1008, fluid is drawn from a volume external to the housing to create a second flow. Creation of the second fluid flow can be accomplished via a second displacement unit, such as a blower or other equivalent dependent on the type of fluid employed. At numeral 1010, the first flow is combined with the second flow to create a combined flow. As the second flow generally has a temperature that is less than the first flow, so too does the combined flow have a lower temperature than the first flow. In this manner, when the combined flow is expelled to a volume external the housing at 1012, it can be within a determined temperature range commensurate with the mass flow rate of the first flow and/or the second flow.

The method continues to via step B to a methodology 1100 as depicted in FIG. 11, which monitors the temperatures associated with the thermal management system and controls the first displacement unit in response thereto. At reference numeral 1102, a first temperature associated with the internal region of the enclosure is monitored. Such temperature monitoring can occur utilizing a temperature sensor or equivalent which transmits data to the control component 302. In turn, the control component can interpret the data from the temperature sensor to determine temperature information contained therein. Similarly, a second temperature associated with the combined flow can be monitored at step 1104 utilizing a temperature sensor for the collection and transmission of temperature information at a merging element.

At 1106, if the first temperature within the internal region of the enclosure is greater than an upper threshold value, the rate of the first flow can be increased for period of time at 1108. If this rate increase occurs more than a frequency threshold at 1112, the method will continue to step C in FIG. 12. If the rate increase is not greater than a frequency threshold, indicative of a temperature range which is within a desired threshold, the method moves to step 1110 wherein the rate of the first flow is maintained at a standard speed, which can be set by a user. Similarly, if the first temperature is not greater than an upper threshold value at 1106, the rate of the first flow can be maintained at a standard speed again at 1110. Regardless of whether the first temperature is greater than, less than, or equal to an upper threshold value at 1106, the method returns to 1106 to continuously verify that the temperature is within a desired range.

If the rate increase of the first flow is greater than a frequency threshold, the method moves to methodology 1200 wherein the second temperature is compared to a threshold value at 1202. If the second temperature is greater than a threshold value, the rate of the second flow is increased at 1204. If the rate of the second flow is greater than a threshold value at 1208, the electronic devices shut down at 1210 as no further action can be taken to mitigate the temperature increase. Once the electronic device shuts down at 1210, the method reverts to step A and back to step 1002 to begin the evacuation of heat from the housing as set forth in steps 1004 through 1012.

If, however the second temperature is not greater than the threshold value, the rate of the second flow is maintained at 1206. The method reverts back to 1202 if the rate of the second flow is not greater than a threshold value or if the rate of the second flow is maintained in order to continuously monitor the second temperature. By utilizing the methodology as set forth in FIGS. 10 through 12, thermal management of an enclosure housing one or more electronic devices can be facilitated.

Figure 13:
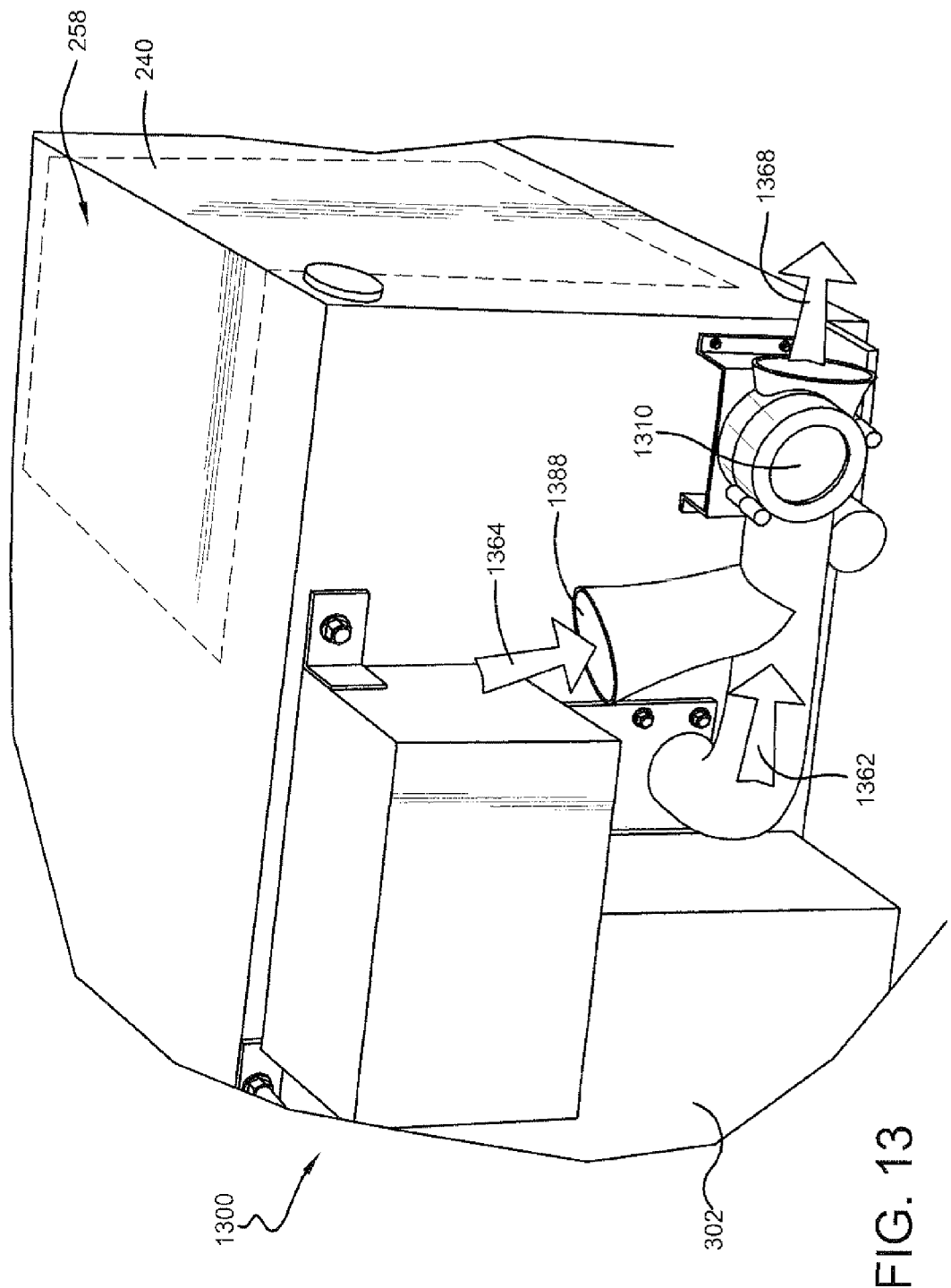
FIG. 13 illustrates a single displacement unit that draws the first flow and the second flow through the merging element and into the surrounding atmosphere.

FIG. 13 illustrates yet another embodiment 1300 wherein a fluid displacement device 1368 is disposed coupled to the output of the merging element 418. In this embodiment, the fluid displacement device 1310 draws fluid from the housing from the interior region 240 of the housing 258 to create a flow 1362. In this manner, the fluid displacement device 1310 acts to draw fluid out of the housing to create a negative external pressure in contrast to creating a positive pressure within the housing 258 in order to force air out of an outlet, as described above. The fluid displacement device 1310 also serves to draw air in from an opening 1388 which is an aperture used to receive air from the surrounding atmosphere. This air is drawn into the opening 1388 as a second flow 1364 which is merged with the first flow 1362 within the merging element 418 as described above. Thus, in place of a blower creating a positive pressure within the housing 258 to create a fluid flow, such flow is created via the displacement device 1310 to create substantially the same affect to mix the flows 1362 and 1364 to create a flow 1368 that is at or below a particular desired temperature.

Figure 14:
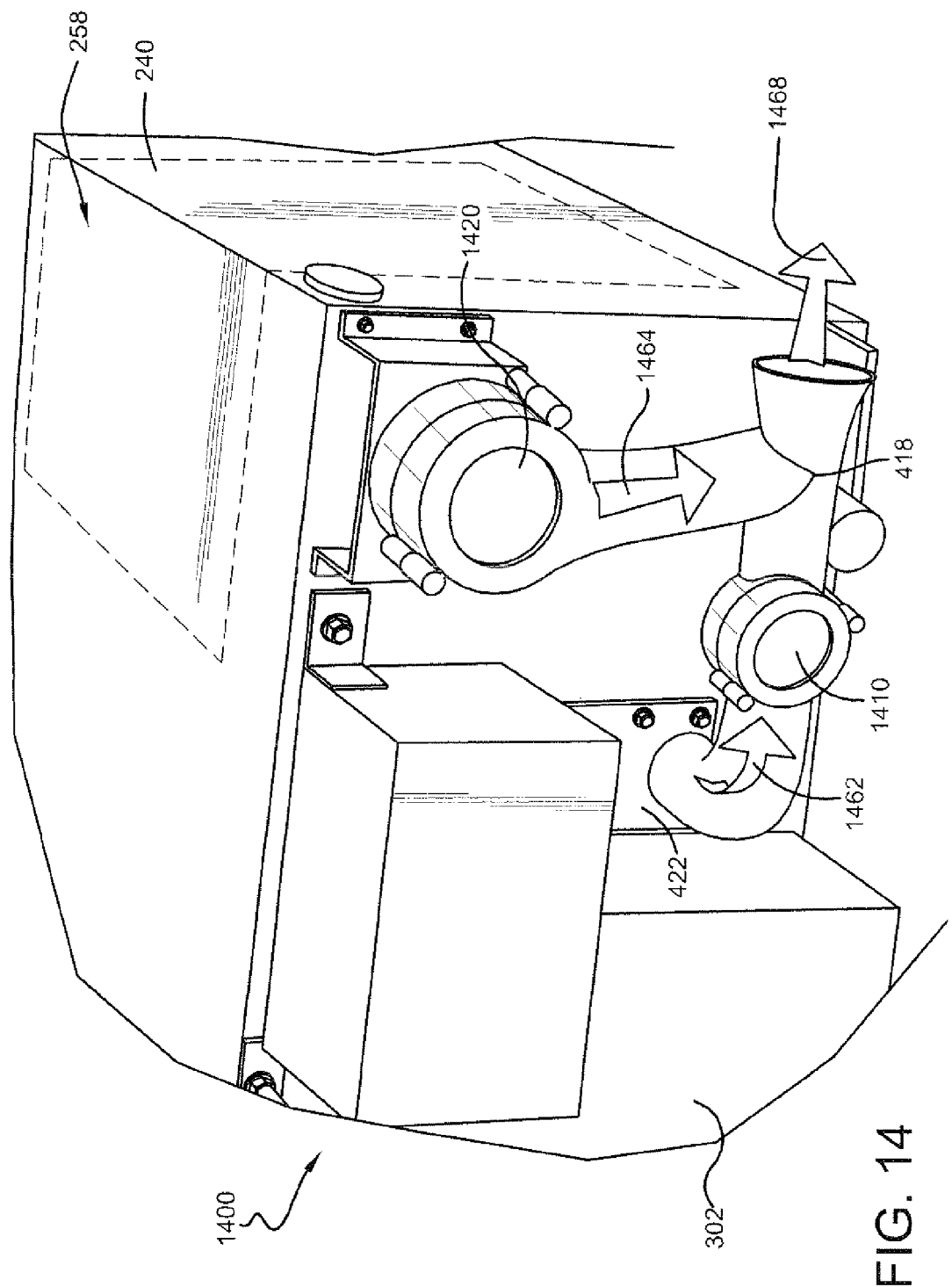
FIG. 14 illustrates a perspective view of an exemplary embodiment of the thermal management system that employs two displacement units to draw fluid from the enclosure to combine with a second fluid before it is expelled to the surrounding atmosphere.

Similarly, FIG. 14 illustrates another embodiment 1400 wherein a fluid displacement device 1410 is coupled to the outlet 422 to create a flow 1462 drawn therefrom. A second flow as created by displacement device 1420 is used to create a second flow 1464, wherein the displacement device 1420 draws air from the surrounding atmosphere to create a flow 1464. The flows 1462 and 1464 are combined at the merging element 418 and exhausted as a flow 1468 therefrom. Thus, in place of a motor creating a positive pressure within the housing 258 to urge a flow therefrom, the displacement device 1410 is employed to create a negative external pressure to draw the flow 1462 from the housing 258 for mixing at the merging element 418. It is to be appreciated, however, that substantially any configuration of displacement devices that create appropriate positive or negative pressures at particular locations can be used to create desired flows for the egress of fluid from the housing 258 in order to maintain a particular desired temperature.

Another embodiment relates to a system for an electronic device. The system comprises a housing having one or more walls that define an internal region. The system further comprises an outlet port that is fluidically coupled to the internal region of the housing, which allows emission of a first fluid flow from the internal region of the housing. The first fluid flow has a first temperature. The internal region may house an electronic device that produces waste heat. The system further comprises a merging element having a first input port fluidically coupled to the outlet port, a second input port, and an output port. The output port fluidically couples the first input port and the second input port. The system further comprises at least one displacement unit fluidically coupled to the internal region and/or to the merging element. The at least one displacement unit is configured to create the first fluid flow and to create a second fluid flow through the second input port of the merging element. The second fluid flow has a second temperature that is less than the first temperature. The merging element merges the first flow with the second flow to create a combined flow for exhausting external to the housing. The combined flow has a third temperature less than the first temperature.

In another embodiment, a system for an electronic device includes a housing that has one or more walls that define an internal region. The housing can accommodate one or more electronic devices such as an energy storage device. An outlet port is fluidically coupled to the internal region of the housing, which allows the emission of a fluid from the internal region of the housing as a first flow and a first temperature. A merging element merges the first flow with the second flow to create a combined flow, which has a second temperature that is less then the first temperature. An exhaust port is fluidically coupled to the outlet port to discharge the combined flow to a volume external of the housing. A semi-permeable barrier at least partially encloses the exhaust port to facilitate entrainment of the combined flow after it is discharged.

In yet another embodiment, a system for an electronic device includes a housing having one or more walls that define an internal region and an outlet port that is fluidically coupled to the internal region of the housing, which allows the emission of a fluid from the internal region of the housing as a first flow at a first temperature. A merging element merges the first flow with a second flow to create a combined flow, which has a second temperature that is less than the first temperature. An inlet port fluidically couples the internal region of the housing to a source that is external to the housing. A first displacement unit pushes fluids through the inlet port, into the internal region of the housing, through the outlet port, and out of the housing to create the first flow. The temperature of the first flow is lower before it is pushed through the inlet port then after it is pushed through the outlet port.

A control system that includes a control component and one or more sensors can be employed to operate the thermal management system within desired threshold parameters. A first sensor detects a mass flow rate of the first displacement unit. A control component receives the mass flow rate value of the first displacement unit from the first sensor, compares it to a threshold value. A second sensor can be employed to measure a temperature of the combined the flow. The control component receives a combined flow temperature from the second sensor, compares it to a threshold value, and modifies the fluid output of the second displacement unit proportional to a disparity between the combined flow temperature and the threshold value. A control system can also be employed to maintain temperature in a cabinet below a threshold by one or more of increasing the second air mask flow rate, activating a compressor to chill the first flow, increasing the mass flow rate out of an interior region of the cabinet, and/or derating the electronic device to control the amount of heat being generated.

In an embodiment, a merging element for merging a first flow with a second flow comprises a T- or Y-section of conduit. The conduit has a first inlet duct section defining a first interior passage, and a second inlet duct section defining a second interior passage. The first inlet duct section is attached to the second inlet duct section, and the first and second interior passages are in fluid communication. The conduit further includes an output duct section defining a third interior passage. The output duct section is attached to the first and second inlet duct sections, and the third interior passage is in fluid communication with the first and second interior passages. In operation, the first flow (passing through the first interior passage) and the second flow (passing through the second interior passage) meet at the junction between the first and second interior passages, merge, and continue on, as a combined flow, through the third interior passage.

This written description uses examples to disclose the invention, including the best mode, and also to enable a person of ordinary skill in the art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system for an electronic device, comprising:
    a housing having one or more walls that define an internal region;
    an outlet port that is fluidically coupled to the internal region of the housing, which allows emission of a fluid from the internal region of the housing as a first flow at a first temperature;
    a merging element, fluidically coupled to the outlet port, which merges the first flow with a second flow to create a combined flow, which has a second temperature that is less than the first temperature;
    an inlet port that fluidically couples the internal region of the housing to a fluid source that is external to the housing; and
    a first displacement unit that pushes fluid through the inlet port, into the internal region of the housing, through the outlet port, and out of the housing to create the first flow, the temperature of the first flow is lower before it is pushed through the inlet port than after it is pushed through the outlet port.
2. The system according to claim 1, wherein the electronic device is positioned in the internal region, and the electronic device comprises an energy storage device.
3. The system according to claim 2, wherein the energy storage device is a molten salt battery.
4. The system according to claim 1, wherein the housing has a configuration that is one of a cube, a cuboid, a square-based pyramid, a cone, a triangular prism, a triangular-based pyramid, a cylinder, or a sphere.
5. The system according to claim 1, further comprising a cabinet, wherein the housing is one of a plurality of housings disposed in the cabinet.
6. A cabinet comprising the enclosure as defined in claim 1, wherein the combined flow is vented first to an internal region of the cabinet, and then out into the atmosphere.
7. The system according to claim 1, wherein the outlet port has a diameter capable to facilitate a mass flow rate of the first flow through the outlet port at a rate that is in a range of from about 0.1 cubic feet per minute to about 100 cubic feet per minute.
8. The system according to claim 1, wherein the merging element directs the combined flow on an axis that is between 1 degree and 90 degrees relative to the face of the housing on which the outlet port is disposed.
9. The system according to claim 1, wherein the fluid is a gas.
10. The system according to claim 1, wherein the fluid is water or an organic fluid.
11. The system according to claim 1, wherein the second flow has a temperature that is less than the internal region.
12. The system according to claim 1, wherein the first flow has a temperature in a range of from about 50 degrees Celsius to about 700 degrees Celsius.
13. The system according to claim 1, wherein the second flow has a temperature that is in a range of from about standard room temperature to about 100 degrees Celsius.
14. The system according to claim 1, wherein the combined flow has a temperature that is less than the first flow.
15. The system according to claim 1, wherein the first flow has a mass flow rate that is in a range of from about 0.1 cubic feet per minute to about 100 cubic feet per minute.
16. The system according to claim 1, wherein the second flow has a mass flow rate that is in a range of from about 0.1 cubic feet per minute to about 100 cubic feet per minute.
17. The system according to claim 1, wherein a mass flow rate of the first flow is substantially equivalent to a mass flow rate of the second flow.
18. The system according to claim 1, wherein the merging element further comprises a bypass that splits the fluid into the first flow and the second flow.
19. The system according to claim 1, further comprising an exhaust port, fluidically coupled to the outlet port, which discharges the combined flow to a volume external the housing.
20. The system according to claim 19, further comprising a semi-permeable barrier that at least partially encloses the exhaust port to facilitate entrainment of the combined flow after it is discharged.
21. The system according to claim 1, further comprising a filter disposed between the inlet port and the first displacement unit.
22. The system according to claim 1, further comprising a second displacement unit, fluidically coupled to the merging element, which draws fluid from a volume external to the housing to create the second flow.
23. The system according to claim 22, the second displacement unit has a mass flow rate that is in a range of from about 5 percent to about 5000 percent of a mass flow rate of the first displacement unit.
24. The system according to claim 1, further comprising:
    a first sensor that detects a mass flow rate of the first displacement unit; and
    a control component that receives the mass flow rate value of the first displacement unit from the first sensor, compares it to a threshold value, and outputs a signal if the mass flow rate value is greater than the threshold value.
25. The system according to claim 24, further comprising:
    a second sensor that measures a temperature of the combined flow, wherein the control component receives the combined flow temperature from the second sensor, compares it to a threshold value, and modifies a fluid output of the second displacement unit proportional to a disparity between the combined flow temperature and the threshold value.

26. The system according to claim 1, wherein housing has a plurality of faces, and the outlet port is disposed on the same face as the first displacement unit is disposed.

27. The cabinet according to claim 26, further comprising a controller that maintains the temperature in the cabinet below a threshold by one or more of increasing the second air mass flow rate, activating a compressor to chill the first flow, increasing the mass flow rate out of an interior region of the cabinet, and/or derating the electronic device to control the amount of heat being generated.

28. A method to thermally manage a housing for an energy storage device, comprising:
fludically coupling an internal region of the housing to a fluid source that is external to the housing through an inlet port;
pushing a fluid through the inlet port into an internal region of the housing using a fluid displacement unit;
emitting the fluid from the internal region of the housing through an outlet port as a first flow at a first temperature, the temperature of the first flow is lower before it is pushed through the inlet port than after it is pushed through the outlet port;
drawing fluid from a volume external to the housing to create a second flow at a second temperature, which is less than the first temperature of the first flow; and
merging the first flow with the second flow.

29. The method according to claim 28, further comprising:
creating a combined flow by the merging of the first flow with the second flow; and
discharging the combined flow to a volume external the housing.

30. The method according to claim 29, further comprising controlling a mass flow rate of the second flow based on a temperature of the combined flow.

31. The method according to claim 29, further comprising entraining the combined flow before it is discharged to the volume external the housing.

* * * * *